(12) United States Patent
Tsukada et al.

(10) Patent No.: US 11,072,268 B2
(45) Date of Patent: Jul. 27, 2021

(54) HEAD-REST OF A CAR SEAT

(71) Applicant: TACHI-S Co., Ltd., Tokyo (JP)

(72) Inventors: Masaki Tsukada, Tokyo (JP); Kouichi Moroi, Tokyo (JP); Hitoshi Abe, Tokyo (JP); Takafumi Kojima, Tokyo (JP); Satoshi Hashimoto, Tokyo (JP); Naoyuki Makita, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/729,604

(22) Filed: Dec. 30, 2019

(65) Prior Publication Data

US 2020/0247293 A1 Aug. 6, 2020

(30) Foreign Application Priority Data

Feb. 6, 2019 (JP) .............................. JP2019-019919

(51) Int. Cl.
*B60N 2/70* (2006.01)
*B60N 2/58* (2006.01)
*B60N 2/809* (2018.01)

(52) U.S. Cl.
CPC ......... *B60N 2/7017* (2013.01); *B60N 2/5875* (2013.01); *B60N 2/809* (2018.02)

(58) Field of Classification Search
CPC .. B60N 2/5875; B60N 2/5816; B60N 2/5883; B60N 2/809; B60N 2/80
USPC ........................................ 297/391, 400, 399
See application file for complete search history.

(56) References Cited

U.S. PATENT DOCUMENTS

| 5,681,087 | A | * | 10/1997 | Yamano | ................ | B29C 44/581 |
| | | | | | | 297/391 |
| 5,855,831 | A | * | 1/1999 | Takei | ........................ | B60N 2/80 |
| | | | | | | 264/46.6 |
| 6,200,506 | B1 | * | 3/2001 | Takei | .................... | B29C 44/351 |
| | | | | | | 264/276 |
| 6,527,344 | B2 | * | 3/2003 | Takei | ..................... | B60N 2/838 |
| | | | | | | 297/391 |
| 9,615,682 | B1 | * | 4/2017 | Maddocks | ............... | B60N 2/80 |
| 2015/0246628 | A1 | * | 9/2015 | Ishimoto | ................ | B60N 2/809 |
| | | | | | | 297/410 |
| 2017/0210261 | A1 | * | 7/2017 | Ishii | .......................... | B60N 2/58 |
| 2017/0334708 | A1 | * | 11/2017 | Cheon | ....................... | B60N 2/80 |

(Continued)

FOREIGN PATENT DOCUMENTS

| JP | 2007-222404 A | 9/2007 |
| JP | 2014-110833 A | 6/2014 |

OTHER PUBLICATIONS

Translation from Espacenet.com of JP2014-110833. (Year: 2020).*

*Primary Examiner* — Mark R Wendell
(74) *Attorney, Agent, or Firm* — Fitch, Even, Tabin & Flannery, LLP

(57) ABSTRACT

There is provided a head-rest of a car sheet which is configured to includes: a skin configured to cover a surface of the head-rest; a foamed material filled in the head-rest covered by the skin; and a stay extending to an outside from the skin in which the foamed material is filled, wherein the head-rest has a gate shape by indenting a center portion of a lower surface of the head-rest, and a groove portion is formed at the indented center portion of the gate shape by making end portions of the skin abut against each other, and members which are softer than the skin are seamed to the respective end portions of the skin which abut against each other in the groove portion.

20 Claims, 6 Drawing Sheets

(56) References Cited

U.S. PATENT DOCUMENTS

2018/0186044 A1\* 7/2018 Tabata ................. B29C 44/351
2019/0217762 A1\* 7/2019 Tabata ................ B29C 44/1276

\* cited by examiner

HEAD-REST OF A CAR SEAT

BACKGROUND

The present invention relates to a head-rest of a car seat, and more particularly to a head-rest having a gate shape where a center portion of a lower surface of the head-rest is formed in an indented shape.

With respect to a head-rest of a car seat, Japanese Unexamined Patent Application Publication No. 2007-222404 discloses a technique where a plurality of skin pieces are seamed with each other along seamed margins on edge portions of the skin pieces and, thereafter, a front side and a back side of the whole skin are reversed from an opening portion (filling port) on a bottom portion of the skin such that the seamed margins are disposed inside. Accordingly, the skin pieces are formed into a bag shape as a whole. A foaming material is filled in the bag-shaped skin from the filling port on the bottom portion of the skin, and the foaming material is foamed and expanded in the bag-shaped skin.

Japanese Unexamined Patent Application Publication No. 2014-110833 discloses a technique where outers of skin pieces are made to overlap with each other and are seamed with each other while taking a seaming margin from an edge of the overlapped skin pieces, and the front and back of the seamed skin pieces are reversed such that the outers of the seamed skin pieces face the surface side thus being formed in a bag shape, and by foaming a urethane raw material in the bag body set in a foam molding die thus forming a head-rest body.

As disclosed also in Japanese Unexamined Patent Application Publication No. 2007-222404 and in Japanese Unexamined Patent Application Publication No. 2014-110833, a head-rest of a car seat is manufactured by skin-integrated foam molding, that is, a foamed urethane slab is laminated to an outer of a fabric, a synthetic leather or the like, a plurality of skin pieces formed by laminating a polyurethane film to a back surface of the fabric, the synthetic leather or the like are seamed with each other in a state where outers of the skin pieces are made to overlap with each other thus forming a bag body, the front and back of the bag body are reversed, and a core portion is filled in the bag body and is foamed.

The head-rests disclosed in Japanese Unexamined Patent Application Publication No. 2007-222404 and in Japanese Unexamined Patent Application Publication No. 2014-110833 have an approximately trapezoidal shape, and are flattened in a longitudinal direction of the head-rest. When an outer and a back of the whole seamed skin are reversed, the whole skin is reversed from an opening portion which is formed on a bottom portion of the head-rest in a protruding manner and has a relatively large width. Then, the opening portion is pushed into a bag body so as to prevent the protruding portion from being exposed to the outside of the head-rest.

The opening portion can be formed with a relatively large width on the bottom surface of the head-rest having an approximately trapezoidal shape and hence, the opening portion can be deformed flexibly so that the opening portion can be easily closed in a state where the opening portion is pushed into the bag body. Accordingly, it is unnecessary to seam the opening portion before the opening portion is pushed into the bag body. As a result, an operation of pushing the opening portion into the bag body can be performed relatively easily.

On the other hand, in the case of a gate-shaped head-rest where a center portion of a lower surface of the head-rest is formed in an indented shape, an opening portion to be formed on a bottom portion of a skin can be formed only at a relatively flat surface on a bottom portion indented in an indented shape. That is, unlike the conventional head-rest having an approximately trapezoidal shape and is flattened in the longitudinal direction, in the gate-shaped head-rest, the large opening portion cannot be formed. Accordingly, compared to the conventional head-rest having an approximately trapezoidal shape and is flattened in the longitudinal direction, in the gate-shaped head-rest, there is no way but to decrease a width of the opening portion formed on the bottom of the skin.

In the case where the front and back of the bag body are reversed through the opening portion having a small width, and then the protruding portion including the opening portion is pushed into the bag body in a state where the opening portion is opened without being seamed as in the case of the conventional techniques disclosed in Japanese Unexamined Patent Application Publication No. 2007-222404 and in Japanese Unexamined Patent Application Publication No. 2014-110833, rigidity of the opening portion is increased due to the opening portion having the small width. Accordingly, there is a possibility that the opening portion is not sealed in the bag body so that a gap is formed in the opening portion. If the gap is formed in the opening portion, when the skin-integrated foaming-molding is performed by supplying a foaming material into the bag body, there is a possibility that a foamed material leaks to the outside through the gap so that quality of an external appearance of the head-rest is lowered.

As a countermeasure to overcome this drawback, a method is considered in which an opening portion of a skin piece is sealed, and then the opening portion is pushed into a bag body thus preventing a protruding portion from being exposed to the outside of a head-rest. However, in this case, operability of an operation of pushing the protruding portion including the seamed opening portion into the bag body is deteriorated compared to a conventional case by an amount corresponding to narrowing of the opening portion. Accordingly, there arise a case where the operation takes a considerably long time or a case where the opening portion cannot be completely pushed into the bag body.

SUMMARY

The present invention has been made to overcome the drawbacks of the conventional technique, and it is an object of the present invention to provide a head-rest for car seat where leakage of a foamed material from an opening portion can be prevented with certainty even in the case where the head-rest is a gate-shaped head-rest, and an operation of pushing a protruding portion including an opening portion into a bag body can be performed relatively easily with certainty.

To overcome the abovementioned drawbacks, in the present invention, a head-rest mounted on a car seat includes: a skin which covers a surface of the head-rest; a foamed material which is filled in the head-rest covered by the skin; and a stay which extends to an outside from the skin in which the foamed material is filled, wherein the head-rest has a gate shape by indenting a center portion of a lower surface of the head-rest, a groove portion is formed at the indented center portion of the gate shape by making end portions of the skin abut against each other, and members which are softer than the skin are seamed to the respective end portions of the skin which are made to abut against each other in the groove portion.

Further, to overcome the previously-mentioned drawbacks, according to the present invention, in a head-rest which is mounted on a car seat, a surface of the head-rest is covered by a skin and a foamed material is filled in the head-rest, a center portion of a lower surface of the head-rest is indented so that the head-rest has a gate shape, a groove portion is formed by making end portions of the skin abut against each other at the center portion of the gate shape, members which are softer than the skin are seamed to the respective end portions of the skin which abut against each other in the groove portion, and the members which are softer than the skin and are seamed to the respective end portions of the skins are seamed with each other.

According to the present invention, even in the case of the gate-shaped head-rest, it is possible to prevent the leakage of the foamed material from the opening portion with certainty, and the operation of pushing the protruding portion including the opening portion formed on the bottom portion of the skin into the bag body can be performed relatively easily and with certainty.

These features and advantages of the invention will be apparent from the following more particular description of preferred embodiments of the invention, as illustrated in the accompanying drawings.

DESCRIPTION OF THE PREFERRED EMBODIMENTS

The present invention is characterized in that a bag-shaped skin is formed such that a plurality of skin members for forming a gate-shaped head-rest are seamed with each other into a bag shape in a state where front surface portions of the plurality of skin members opposedly face each other with a protruding opening portion where portions of the skin members are not seamed to each other, the seamed skin members are reversed back to front through the opening portion thus forming, and a stay is inserted into the bag-shaped skin, and thereafter, the opening portion is closed by seaming soft members seamed to the opening portion of the bag-shaped skin, and the protruding portion including the opening portion to which the seamed skin members are seamed is pushed into the bag-shaped skin. With such a configuration, also in the head-rest having the gate shape, an integrated foam molding can be performed without deteriorating an external appearance shape and without lowering operability.

Hereinafter, an embodiment of the present invention is described with reference to drawings.

Embodiment 1

Figure 1:
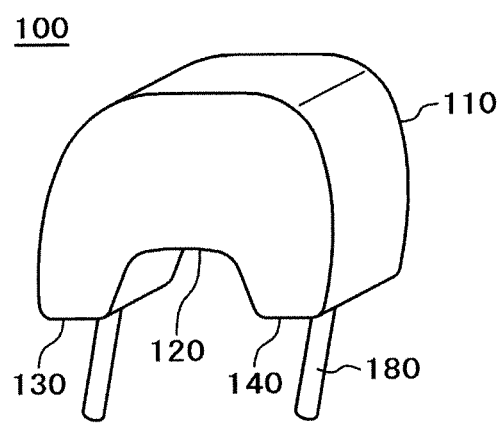
FIG. 1 is a perspective view showing an external appearance of a head-rest having a gate shape according to an embodiment of the present invention.

FIG. 1 shows an external appearance of a head-rest 100 according to this embodiment. The head-rest 100 has a gate shape where a center portion 120 of a lower surface of a body portion 110 is indented, and stays 180 extend from protruding portions 130, 140 on both sides of the head-rest 100 respectively.

Substantially in the same manner as the method disclosed in Japanese Unexamined Patent Application Publication No. 2014-110833, a front surface of the body portion 110 of the head-rest 100 is covered by a skin material. The skin material is formed by laminating a foamed urethane slab to an outer made of a fabric, a synthetic leather or the like. A poly-urethane film is laminated to a back surface of the body portion 110. The inside of the body portion 110 covered by the skin is filled with a foamed urethane material. The skin material has the abovementioned configuration and hence, the skin material has relatively high rigidity.

Figure 2:
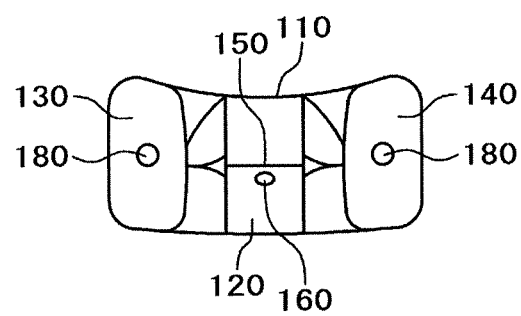
FIG. 2 is a plan view showing the external appearance of the head-rest having the gate shape according to the embodiment of the present invention as viewed from a side of a bottom surface of the head-rest in FIG. 1.

FIG. 2 shows the head-rest 100 as viewed from the bottom surface side. At an approximately center in a vertical direction of the gate-shaped center portion 120 in a state shown in FIG. 2, a groove portion 150 where the skin material on an upper side and the skin material on a lower side abut against each other is formed. Further, on a portion of the center portion 120 lower side of the groove portion 150, a hole 160 which allows a pipe for supplying a material for forming foamed urethane into the skin formed in a bag shape to pass therethrough is formed. Stays 180 extend from the protruding portions 130, 140 on both sides of the center portion 120.

Hereinafter, steps of forming the head-rest 100 by forming the bag-shaped skin by seaming the skin materials and by filling the bag-shaped skin with foamed urethane are described with reference to drawings.

Figure 3:
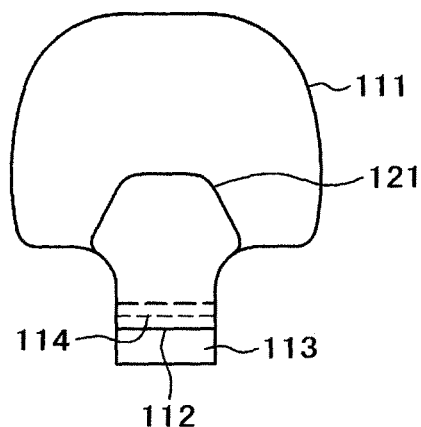
FIG. 3 is a plan view of a first skin and a first patch cloth showing a state where the first patch cloth is seamed to the first skin of the head-rest having the gate shape according to the embodiment of the present invention.

FIG. 3 shows a front-side skin portion (hereinafter also simply referred to as a skin portion) 111 of the body portion 110 out of the skin which covers a surface of the body portion 110 as viewed from a back surface side. Although the skin portion 111 has a more complicated stereoscopic shape in an actual head-rest, for the sake of convenience of the description, the skin portion 111 is shown with a simple shape. To the skin portion 111, a skin portion 121 which corresponds to a portion for forming a gate shape on a lower portion of the skin portion 111 is seamed. Although the skin portion 121 also has a complicated stereoscopic shape in the actual head-rest, for the sake of convenience of the description, the skin portion 121 is also shown with a simple shape.

As shown in FIG. 3, a thin skin member 113 (hereinafter also referred to as a front-side thin skin material) is seamed to a protruding portion 112 formed on a lower portion of the skin portion 121 in the vicinity of a distal end portion of the thin skin member 113 at a seaming portion 114 (hereinafter also referred to as a front-side seaming portion). The thin skin member 113 is made of the same material as the material for forming the outer of the skin material such as a fabric, a synthetic leather or the like. The thin skin member 113 is formed with a thickness smaller than a thickness of the skin material for forming the protruding portion 112. Accordingly, the thin skin member 113 has smaller rigidity of the skin material for forming the protruding portion 112 and hence, the thin skin member 113 is easily bent compared to the protruding portion 112.

Figure 4:
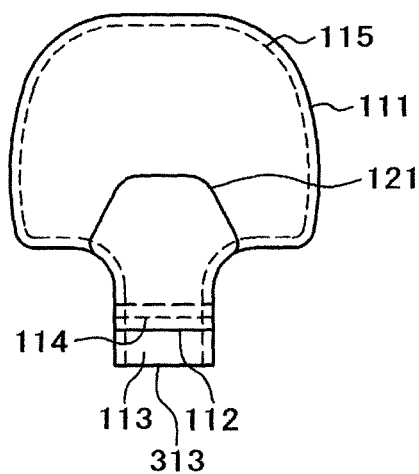
FIG. 4 is a front view showing a state where the first skin and a second skin of the head-rest having the gate shape according to the embodiment of the present invention are seamed with each other.

FIG. 4 shows a state where the front-side skin portion 111 and a side surface portion not shown in the drawing are seamed with each other at a seaming portion 115. A rear-side skin portion 211 (see FIG. 7: hereinafter also referred to as a skin portion) is also seamed with the side surface portion not shown in the drawing along the position corresponding to the seaming portion 115. The thin skin member 113 seamed to the front-side skin portion 111 and the thin skin member 213 which is seamed to the rear-side skin portion 211 (hereinafter also referred to as a rear-side thin skin material) are also seamed with each other at the seaming portion 115. In such a state, a portion where upper end portions of the thin skin members 113, 213 are not seamed with each other forms an opening portion 313. A bag shape is formed by the front-side skin portion 111, the rear-side skin portion 211, and the side surface portions not shown in the drawing. In this state, an outer surface side of the front-side skin portion 111 and an outer surface side of the rear-side skin portion 211 opposedly face each other.

Figure 5:
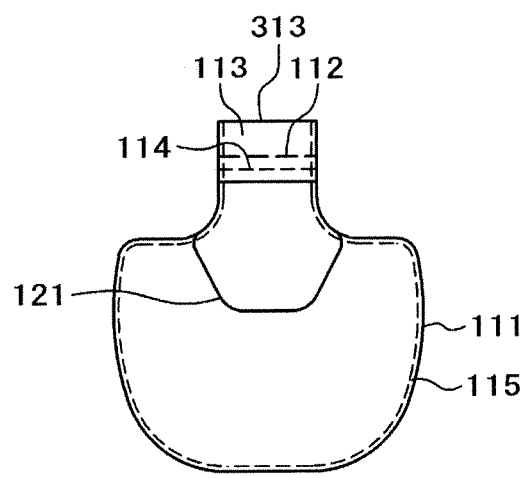
FIG. 5 is a front view of a skin showing a state where the seamed skin of the head-rest having the gate shape according to the embodiment of the present invention is reversed through an opening portion.

Next, the front-side skin portion 111, the rear-side skin portion 211, and the side surface portions not shown in the drawing which are formed in a bag shape are reversed through the opening portion 313 where the upper end portions of the thin skin members 113, 213 are not seamed with each other. As a result, as shown in FIG. 5, front surface sides of the front-side skin portion 111, the rear-side skin portion 211, and the side surface portions not shown in the drawing are exposed to the outside.

Figure 6:
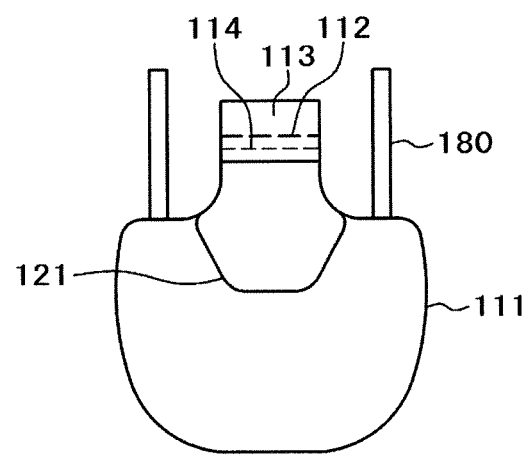
FIG. 6 is a front view of a skin showing a state where a portion of a stay is inserted into a seamed bag-shaped skin in the head-rest having the gate shape according to the embodiment of the present invention.

In a state where the skin portions 111, 121 are formed in a bag shape with the front surface sides of the skin portions 111, 121 exposed to the outside as described above, the stay 180 is inserted into the bag-shaped skin portions 111, 121 through holes (not shown in the drawing) which are formed in the skin portion 111, thus bringing about a state where both end portions of the stay 180 protrude outward from the skin portion 111 as shown in FIG. 6.

Figure 7:
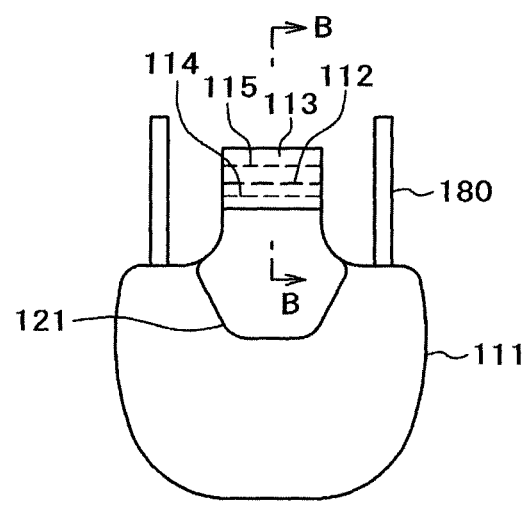
FIG. 7 is a front view of a skin showing a state where an opening portion of the skin is seamed after a portion of the stay is inserted into a seamed bag-shaped skin in the head-rest having the gate shape according to the embodiment of the present invention.

Next, in a state where the stay 180 is mounted in the bag-shaped skin portion, as shown in FIG. 7, the opening portion 313 which is a portion where the upper end portions of the thin skin members 113, 213 are not seamed with each other is seamed at the seaming portion 115, thus completely closing the opening of the bag shape.

Figure 8:
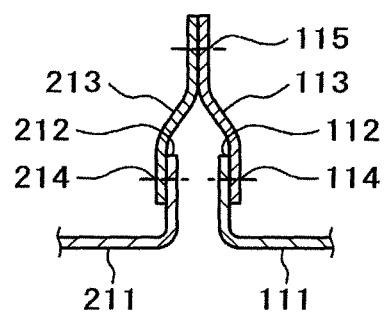
FIG. 8 is a cross-sectional view of the head-rest having the gate shape according to the embodiment of the present invention in a state shown in FIG. 7 as viewed in a direction indicated by an arrow B-B.

FIG. 8 shows a cross-sectional view of such a state as viewed in a direction indicated by an arrow B-B in FIG. 7. The front-side thin skin member 113 which is seamed to the protruding portion 112 (hereinafter also referred to as a front-side protruding portion) of the front-side skin portion 111 at the seaming portion 114, the rear-side thin skin member 213 which is seamed to the protruding portion 212 (hereinafter also referred to as a rear-side protruding portion) of the rear-side skin portion 211 at the seaming portion 214 (hereinafter also referred to as a rear-side seaming portion) are seamed with each other at the seaming portion 115 in the vicinity of distal end portions of the respective thin skin materials thus bringing about a state where the opening of the bag shape is closed.

Figure 9:
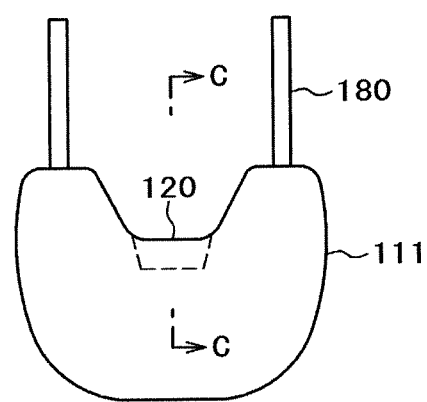
FIG. 9 is a front view of a skin showing a state where an opening portion of the head-rest having the gate shape according to the embodiment of the present invention is seamed, and the seamed opening portion is inserted and pushed into the bag-shaped skin after a portion of the stay is inserted into the seamed bag-shaped skin.

Next, in a state where the stays 180 are mounted in the bag-shaped skin portion, as shown in FIG. 9, the front-side thin skin member 113 and the rear-side thin skin member 213, and the front-side protruding portion 112 and the rear-side protruding portion 212 are pushed into a space formed between the skin portions 111, 121 formed in a bag shape. With such a configuration, as shown in FIG. 9, a center portion of the bag shape is indented so that the center portion 120 is formed and a gate shape is formed.

In such an operation, the front-side thin skin member 113 and the rear-side thin skin member 213 have smaller rigidity than the front-side protruding portion 112 and the rear-side protruding portion 212 and hence, the front-side thin skin member 113 and the rear-side thin skin member 213 can be easily bent compared to the front-side protruding portion 112 and the rear-side protruding portion 212. Accordingly, an operation of pushing the front-side thin skin member 113 and the rear-side thin skin member 213 which are seamed with each other at the seaming portion 115, and the front-side protruding portion 112 and the rear-side protruding portion 212 into the space formed between the skin portions 111, 121 in a bag shape can be performed relatively easily.

To the contrary, in the case where the front-side thin skin member 113 and the rear-side thin skin member 213 are not used, the opening portion is closed by seaming a portion of the front-side protruding portion 112 in the vicinity of a distal end portion of the front-side protruding portion 112 and a portion of the rear-side protruding portion 212 in the vicinity of a distal end portion of the rear-side protruding portion 212 together. Considering the a case where the front-side protruding portion 112 and the rear-side protruding portion 212 having the configuration where the opening portion is closed by seaming the portions in the vicinity of the distal end portions of the front-side protruding portion 112 and the rear-side protruding portion 212 are pushed into the space formed between the skin portions 111, 121 formed into a bag shape, since the front-side protruding portion 112 and the rear-side protruding portion 212 have the relatively high rigidity, such an operation of pushing the front-side protruding portion 112 and the rear-side protruding portion 212 having the abovementioned configuration into the space formed between the bag-shaped skin portions 111, 121 exhibits poor operability and requires a relatively long time for such an operation. Further, since the operability is poor, the external appearance of a product after such a pushing operation becomes is not stable so that irregularities easily occur in quality of the products.

On the other hand, by adopting the configuration of this embodiment, operability in operation of pushing the front-side thin skin member 113 and the rear-side thin skin member 213 which are seamed with each other at the seaming portion 115, and the front-side protruding portion 112 and the rear-side protruding portion 212 into the space formed between the bag-shaped skin portions 111, 121 can be enhanced, and the external an appearance shape of a product after such a pushing operation can be made uniform so that the product can maintain high quality.

Figure 10:
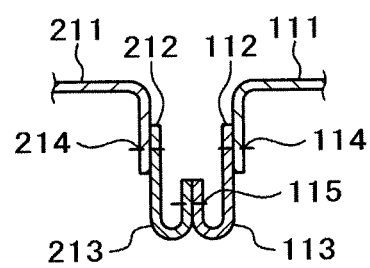
FIG. 10 is a cross-sectional view of the head-rest having the gate shape according to embodiment of the present invention in a state shown in FIG. 9 where the seamed opening portion of the head-rest is inserted into the bag-shaped skin as viewed in a direction indicated by an arrow C-C.

FIG. 10 shows a cross-sectional view of such a state as viewed in a direction indicated by an arrow C-C in FIG. 9. In FIG. 10, a portion on an upper side of the skin portions 111, 211 indicates the outside of the bag-shaped skin portion, and a portion on a lower side of the skin portions 111, 211 indicates the inside of the bag-shaped skin portion. The skin portions 111, 211 and the front-side thin skin member 113 and the rear-side thin skin member 213 which are seamed with each other at the seaming portion 115 are brought into a state where the skin portions 111, 211 and the front-side thin skin member 113 and the rear-side thin skin member 213 are pushed into the bag-shaped portion formed of the skin portions 111, 211.

In such a state, the front-side thin skin member 113 and the rear-side thin skin member 213 are not exposed to the upper side of the skin portions 111, 211, that is, the outside of the bag-shaped skin portion formed of the skin portions 111, 211.

Figure 11:
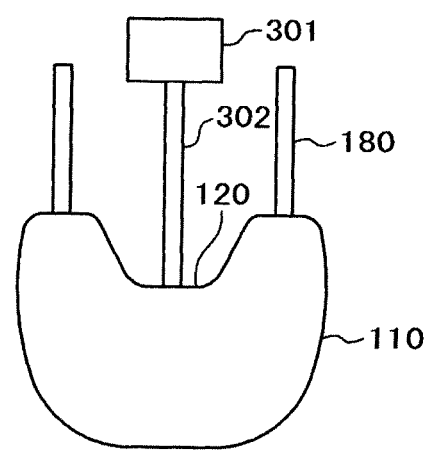
FIG. 11 is a front view of a skin showing a state of the head-rest having the gate shape according to the embodiment of the present invention where a material for forming foamed urethane is supplied into the bag-shaped skin after the seamed opening portion is inserted by pushing into the bag-shaped skin.

In a state where the skin portions 111, 211, and the front-side thin skin member 113 and the rear-side thin skin member 213 which are seamed with each other at the seaming portion 115 are pushed into the bag-shaped portion formed of the skin portions 111, 211 as described above, as shown in FIG. 11, a material for forming foamed urethane is supplied into the skin formed in a bag shape from a foamed urethane tank 301 by inserting a pipe 302 into the hole 160 (see FIG. 2). With such an operation, the material for forming foamed urethane supplied into the skin formed in a bag shape is foamed so that the bag-shaped skin portion is filled with foamed urethane material.

In such an operation, the front-side thin skin member 113 which is seamed to the protruding portion 112 of the front-side skin portion 111 at the seaming portion 114 and the rear-side thin skin member 213 which is seamed to the protruding portion 212 of the rear-side skin portion 211 at the seaming portion 214 are seamed to each other at the seaming portion 115 in the vicinity of the distal end portions of the front-side thin skin member 113 and the rear-side thin skin member 213 and hence, the opening of the bag shape is in a closed state. Accordingly, there is no possibility that urethane foamed in the bag-shaped skin is leaked to the outside of the bag-shaped skin.

Further, due to urethane foamed in the bag-shaped skin, the bag-shaped skin is pushed out from the inside to the outside of the bag-shaped skin. Accordingly, portions of the bag-shaped skin ranging from the respective corner portions of the skin portions 111, 211 to the seaming portions 114, 214 shown in FIG. 10 are pushed out in a direction that the portions approach each other and are brought into contact with each other and hence, the groove portion 150 described with reference to FIG. 2 is formed.

As a result, the front-side thin skin member 113 and the rear-side thin skin member 213 and the front-side protruding portion 112 and the rear-side protruding portion 212 which are pushed into the space formed between the bag-shaped skin portions 111, 211 as described with reference to FIG. 9 are not viewable from the outside. Accordingly, it is possible to form the head-rest 100 which exhibits an excellent external appearance shown in FIG. 1.

In the above described embodiment, as shown in FIG. 7 and FIG. 10, the description is made with respect to the state where the front-side thin skin member 113 and the rear-side thin skin member 213 are seamed to the outer side of the surface of the front-side protruding portion 112 and the outer side of the surface of the rear-side protruding portion 212 respectively. However, the front-side thin skin member 113 and the rear-side thin skin member 213 may be seamed to a polyurethane film side on a back surface of the front-side protruding portion 112 and a polyurethane film side on a back surface of the rear-side protruding portion 212 respectively.

Further, in this embodiment, the description is made with respect to the case where the steps are performed such that the skin formed in a bag shape is reversed back to front as shown in FIG. 5, and then the stays 180 are inserted into the bag-shaped skin as shown in FIG. 6 and, thereafter, the front-side thin skin member 113 and the rear-side thin skin member 213 are seamed with each other at the seaming portion 115 close to the distal end portions of the respective thin skin members 113, 213 as shown in FIG. 7. However, steps may be performed such that the front and back of the bag-shaped skin are reversed, and then the front-side thin skin member 113 and the rear-side thin skin member 213 are seamed with each other at the seaming portion 115 close to the distal end portions of the respective thin skin members 113, 213 and, thereafter, the stays 180 are inserted into the bag-shaped skin.

Further, steps may be performed such that the stay 180 is mounted before the bag-shaped skin is reversed back to front, and then the bag-shaped skin is reversed back to front. This order of steps is effective in the configuration where the stay 180 is not formed by simply bending a pipe but is formed of a pipe to which other parts are connected by welding or the like.

According to this embodiment, even in the case where the head-rest is a gate-shaped head-rest, the head-rest can be formed by foaming-molding by filling a material for forming a foamed material into the skin materials formed on a surface of the head-rest without deteriorating an external appearance of the gate-shaped head-rest. Further, in such an operation, a leakage of the foamed material can be prevented with certainty. Further, an operation of pushing the protruding portions including the opening portion formed on the bottom portion of the skin into the bag body can be relatively easily performed with certainty.

Modification 1

In the abovementioned embodiment, the description is made with respect to the example where the front-side thin skin member 113 and the rear-side thin skin member 213 are made of the same material as the outer of the skin material such as a fabric, a synthetic leather or the like. However, in this modification, the front-side thin skin member 113 and the rear-side thin skin member 213 are made of a material different from the outer of the skin material, that is, a material which is softer than the outer of the skin material. For example, a soft non-woven fabric is used for forming the front-side thin skin member 113 and the rear-side thin skin member 213.

In the case where the soft non-woven fabric is used as the front-side thin skin member 113 and the rear-side thin skin member 213 in this manner, an operation of pushing the front-side thin skin member 113 and the rear-side thin skin member 213, and the front-side protruding portion 112 and the rear-side protruding portion 212 described with reference to FIG. 9 into the space formed in a bag shape between the skin portions 111, 121 can be relatively easily performed. Accordingly, operability is enhanced and, at the same time, an external appearances of a product obtained after a pushing operation can be made uniform so that the product can maintain high quality.

The steps of manufacturing the head-rest 100 according to this modification is equal to the steps described in the embodiment 1 and hence, the detailed description of the steps of manufacturing the head-rest 100 according to this modification is omitted.

Modification 2

In the abovementioned embodiment, the description is made with respect to the case where the front-side thin skin member 113 and the rear-side thin skin member 213 are seamed with each other at the seaming portion 115 close to the distal end portions of the respective thin skin members 113, 213 thus closing the opening of the bag shape. However, instead of using seaming, the front-side thin skin member 113 and the rear-side thin skin member 213 may be adhered to each other by sandwiching an adhesive agent (a hot melt) at a position between the front-side thin skin member 113 and the rear-side thin skin member 213 corresponding to the seaming portion 115 and by heating the adhesive agent.

Although the invention made by the inventors of the present invention has been described in detail heretofore based on the embodiments, it is needless to say that the present invention is not limited to the abovementioned embodiments, and various modifications are conceivable without departing from the gist of the present invention. For example, although the abovementioned embodiments are described in detail for facilitating the understanding of the description of the present invention, it is not always necessary that these embodiments include all constitutional elements described above. The addition, the deletion or the replacement of other known configuration is also conceivable with respect to constitutional parts of the configurations of the abovementioned embodiments.

The invention claimed is:

1. A head-rest of a car seat mounted on a car seat, comprising:
   a skin configured to cover a front surface of the head-rest;
   a foamed material filled in the head-rest covered by the skin; and
   a stay extending from the skin in which the foamed material is filled to an outside,
   wherein the head-rest has a gate shape by indenting a center portion of a lower surface of the head-rest,
   a groove portion is formed at the indented center portion of the gate shape by making end portions of the skin abut against each other, and
   members which are softer than the skin are seamed to the respective end portions of the skin which are made to abut against each other and the members are inside a bag-shaped space formed by the skin at the groove portion.

2. The head-rest of a car seat according to claim 1, wherein the members which are softer than the skin and are seamed to the respective end portions of the skin are seamed with each other.

3. The head-rest of a car seat according to claim 2, wherein the skin is formed in a closed bag shape by seaming a plurality of skin members and the soft members together.

4. The head-rest of a car seat according to claim 2, wherein the skin is formed by making a plurality of members overlap with each other, and the members which are seamed to the respective end portions of the skin and are softer than the skin are formed of the same member as some of the plurality of members for forming the skin.

5. The head-rest of a car seat according to claim 2, wherein the members which are seamed to the respective end portions of the skin and are softer than the skin are formed of a member different from the members for forming the skin.

6. The head-rest of a car seat according to claim 2, wherein a hole through which a material for forming a foamed material is filled into the head-rest covered by the skin is formed in the skin at the center portion in the vicinity of the groove portion.

7. The head-rest of a car seat according to claim 1, wherein the members which are softer than the skin and are seamed to the respective end portions of the skin are adhered to each other.

8. The head-rest of a car seat according to claim 7, wherein a hole through which a material for forming a foamed material is filled into the head-rest covered by the skin is formed in the skin at the center portion in the vicinity of the groove portion.

9. The head-rest of a car seat according to claim 1, wherein the skin is formed in a closed bag shape by seaming a plurality of skin members and the soft members together.

10. The head-rest of a car seat according to claim 1, wherein the skin is formed by making a plurality of members overlap with each other, and the members which are seamed to the respective end portions of the skin and are softer than the skin are formed of the same member as some of the plurality of members for forming the skin.

11. The head-rest of a car seat according to claim 1, wherein the members which are seamed to the respective end portions of the skin and are softer than the skin are formed of a member different from the members for forming the skin.

12. The head-rest of a car seat according to claim 1, wherein a hole through which a material for forming a foamed material is filled into the head-rest covered by the skin is formed in the skin at the center portion in the vicinity of the groove portion.

13. A head-rest of a car seat mounted on a car seat,
    wherein a surface of the head-rest is covered by a skin and a foamed material is filled in the head-rest,
    the head-rest has a gate shape by indenting a center portion of a lower surface of the head-rest,
    a groove portion is formed at the center portion of the gate shape by making end portions of the skin abut against each other, and
    in the groove portion, members which are softer than the skin are seamed to the respective end portions of the skin which are made to abut against each other, and the members which are seamed to the respective end portions of the skin and are softer than the skin are seamed to each other.

14. The head-rest of a car seat according to claim 13, wherein the skin is formed by making a plurality of members overlap with each other, and members which are seamed to the respective end portions of the skin and are softer than the skin are formed of the same member as some of the plurality of members for forming the skin.

15. The head-rest of a car seat according to claim 14, wherein a hole through which a material for forming a foamed material is filled into the head-rest covered by the skin is formed in the skin at the center portion in the vicinity of the groove portion.

16. The head-rest of a car seat according to claim 13, wherein the members which are seamed to the respective end portions of the skin and are softer than the skin are formed of a member different from the members for forming the skin.

17. The head-rest of a car seat according to claim 16, wherein a hole through which a material for forming a foamed material is filled into the head-rest covered by the skin is formed in the skin at the center portion in the vicinity of the groove portion.

18. The head-rest of a car seat according to claim 13, wherein a hole through which a material for forming a foamed material is filled into the head-rest covered by the skin is formed in the skin at the center portion in the vicinity of the groove portion.

19. A head-rest of a car seat mounted on a car seat, comprising:
- a skin configured to cover a front surface of the head-rest;
- a foamed material filled in the head-rest inside a bag-shaped space formed by the skin;
- a pair of stays, each extending from the skin in which the foamed material is filled to an outside,
- wherein the head-rest has a gate shape by indenting a center portion of a lower surface of the head-rest, and a groove portion is formed at the indented center portion of the gate shape by first and second end portions of the skin that face each other;
- a first member which is softer than the skin seamed to the first end portion of the skin; and
- a second member which is softer than the skin seamed to the second end portion of the skin,
- wherein the first and second members abut against each other inside the bag-shaped space at the groove portion.

20. The head-rest of a car seat according to claim 19, wherein the first and second members are seamed to each other.

* * * * *